(12) United States Patent
Kang et al.

(10) Patent No.: US 7,966,991 B2
(45) Date of Patent: Jun. 28, 2011

(54) METHOD AND APPARATUS FOR CONTROLLING COMBUSTION MODE TRANSITIONS IN AN INTERNAL COMBUSTION ENGINE

(75) Inventors: Jun-Mo Kang, Ann Arbor, MI (US); Hanho Yun, Oakland Township, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 12/410,533

(22) Filed: Mar. 25, 2009

(65) Prior Publication Data

US 2010/0242902 A1    Sep. 30, 2010

(51) Int. Cl.
*F02B 3/04*    (2006.01)
(52) U.S. Cl. .......................................... 123/305; 123/295
(58) Field of Classification Search .................. 123/294, 123/295, 305
See application file for complete search history.

(56) References Cited

U.S. PATENT DOCUMENTS

| | | | |
|---|---|---|---|
| 6,971,338 B2 * | 12/2005 | Kobayashi et al. | 123/21 |
| 6,994,072 B2 | 2/2006 | Kuo et al. | |
| 7,128,047 B2 | 10/2006 | Kuo et al. | |
| 7,370,616 B2 * | 5/2008 | Kuo et al. | 123/90.15 |
| 7,370,633 B2 * | 5/2008 | Kang et al. | 123/305 |
| 7,540,270 B2 * | 6/2009 | Kang et al. | 123/295 |
| 7,680,584 B2 * | 3/2010 | Karrelmeyer et al. | 701/105 |
| 7,689,344 B2 * | 3/2010 | Kang et al. | 701/103 |
| 7,703,434 B2 * | 4/2010 | Sloane et al. | 123/299 |
| 7,730,871 B2 * | 6/2010 | Hattori | 123/299 |
| 7,748,355 B2 * | 7/2010 | Megli et al. | 123/90.15 |

* cited by examiner

*Primary Examiner* — Erick Solis

(57) ABSTRACT

An internal combustion engine is operative in a spark ignition combustion mode and a controlled auto-ignition combustion mode. Operating the engine includes commanding a transition from a first combustion mode to a second combustion mode. A change in openings and closings of the intake and exhaust valves is commanded to a preferred duration of a negative valve overlap period corresponding to operating in the second combustion mode. Fuel injection parameters and spark ignition events are adjusted to effect operation in the second combustion mode only when a realized duration of the negative valve overlap period exceeds a predetermined threshold.

20 Claims, 5 Drawing Sheets

METHOD AND APPARATUS FOR CONTROLLING COMBUSTION MODE TRANSITIONS IN AN INTERNAL COMBUSTION ENGINE

TECHNICAL FIELD

This disclosure relates to operation and control of internal combustion engines, and more specifically to homogeneous-charge compression-ignition (HCCI) engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

Spark-ignition (SI) engines can operate in a variety of different combustion modes, including a homogeneous spark-ignition (SI) combustion mode and a stratified-charge spark-ignition (SI) combustion mode. Spark-ignition (SI) engines can be configured to operate in a homogeneous-charge compression-ignition (HCCI) combustion mode, also referred to as controlled auto-ignition (HCCI) combustion, under predetermined speed/load operating conditions. The controlled auto-ignition (HCCI) combustion comprises a distributed, flameless, auto-ignition combustion process that is controlled by oxidation chemistry. An engine operating in the controlled auto-ignition (HCCI) combustion mode has a cylinder charge that is preferably homogeneous in composition, temperature, and residual exhaust gases at intake valve closing time. Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low NOx emissions. The homogeneous air/fuel mixture minimizes occurrences of rich zones that form smoke and particulate emissions.

When an engine operates in the controlled auto-ignition (HCCI) combustion mode, the engine control comprises lean air/fuel ratio operation with the throttle wide open to minimize engine pumping losses. Air flow into the engine can be controlled by controlling opening and closing of engine intake and exhaust valves, including controlling phasing and lift of opening and closing thereof. When the engine operates in the spark-ignition (SI) combustion mode, the engine control can comprise stoichiometric air/fuel ratio operation, with the throttle valve controlled over a range of positions from 0% to 100% of the wide-open position to control intake air flow to achieve the stoichiometric air/fuel ratio. An engine can have a limited speed/load operating range in the controlled auto-ignition (HCCI) combustion mode due to combustion instability or excessive combustion noise.

It is known to use variable actuation of engine intake and exhaust valves to retain a high proportion of residual combustion products from a previous combustion cycle to provide conditions for auto-ignition in a highly diluted mixture.

SUMMARY

An internal combustion engine includes a system operative to vary openings and closings of intake and exhaust valves. The internal combustion engine is selectively operative in one of a plurality of combustion modes including a spark-ignition (SI) combustion mode, a controlled auto-ignition (HCCI) combustion mode, and a mixed combustion mode. A method for operating the engine includes monitoring an engine operating point, commanding a transition from a first combustion mode to a second combustion mode in response to a change in the engine operating point, commanding changes in openings and closings of the intake and exhaust valves to effect a preferred duration of a negative valve overlap period corresponding to operating in the second combustion mode, and adjusting fuel injection parameters and adjusting spark ignition events to effect operation in the second combustion mode only when a realized duration of the negative valve overlap period exceeds a predetermined overlap period threshold.

BRIEF DESCRIPTION OF THE DRAWINGS

One or more embodiments will now be described, by way of example, with reference to the accompanying drawings, in which.

DETAILED DESCRIPTION

Figure 1:
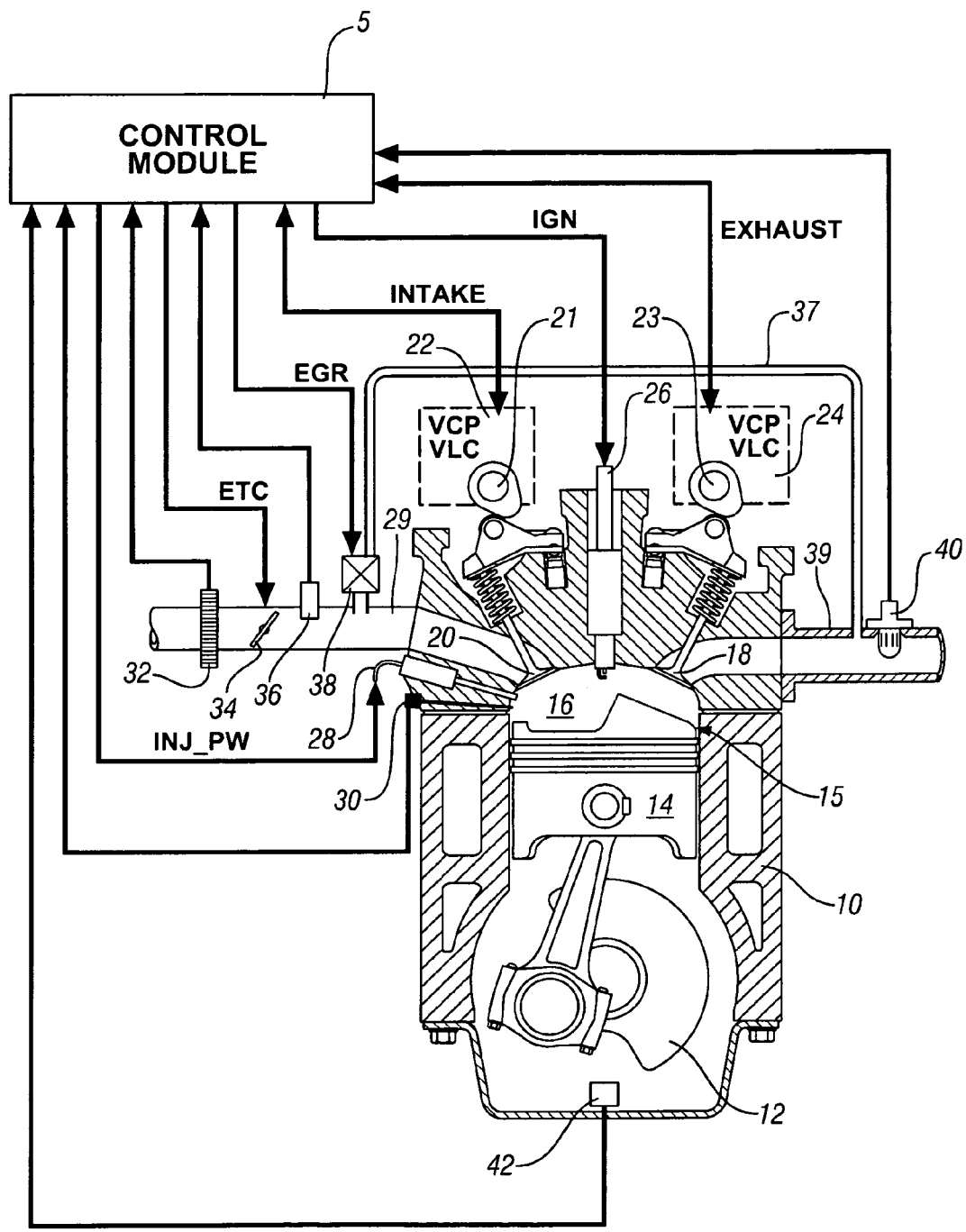
FIG. 1 is a schematic drawing of an engine system, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 that have been constructed in accordance with an embodiment of the disclosure. The engine 10 is selectively operative in a controlled auto-ignition (HCCI) combustion mode and a spark-ignition (SI) combustion mode. The engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system comprises air flow ductwork and devices for monitoring and controlling the air flow. The devices preferably include a mass air flow sensor 32 for monitoring mass air flow and intake air temperature. A throttle valve 34, preferably comprising an electronically controlled device, controls air flow to the engine 10 in response to a control signal (ETC) from the control module 5. A manifold pressure sensor 36 monitors manifold absolute pressure and barometric pressure in the intake manifold 29. An external flow passage 37 having a flow control valve referred to as an exhaust gas recirculation (EGR) valve 38 recirculates residual exhaust gases from an exhaust manifold 39 to the intake manifold 29. The control module 5 preferably controls mass flow of recirculated exhaust gas to the intake manifold 29 by controlling magnitude of opening of the EGR valve 38.

Air flow from the intake manifold 29 into the combustion chamber 16 is controlled by one or more intake valve(s) 20.

Exhaust flow out of the combustion chamber 16 is controlled by one or more exhaust valve(s) 18 to an exhaust manifold 39. The engine 10 is equipped with a system to control openings and closings of the intake and exhaust valves 20 and 18. In one embodiment, the openings and closings of the intake and exhaust valves 20 and 18 can be controlled with an intake camshaft 21 and an exhaust camshaft 23 that are operatively connected to intake and exhaust variable cam phasing/variable lift control (VCP/VLC) devices 22 and 24 respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably comprises a controllable mechanism operative to variably control valve lift (VLC) and variably control cam phasing (VCP) of the intake valve(s) 20 for each cylinder 15 in response to a control signal (INTAKE) from the control module 5. The exhaust VCP/VLC device 24 preferably comprises a controllable mechanism operative to variably control valve lift (VLC) and variably control phasing (VCP) of the exhaust valve(s) 18 for each cylinder 15 in response to a control signal (EXHAUST) from the control module 5. The VCP/VLC devices 22 and 24 each preferably include a controllable two-step valve lift mechanism operative to control magnitude of valve lift, or opening, of the intake and exhaust valve(s) 20 and 18 to one of two discrete steps. The two discrete steps preferably include a low-lift valve open position (about 4-6 mm in one embodiment) for load speed, low load operation, and a high-lift valve open position (about 8-13 mm in one embodiment) for high speed and high load operation. The VCP/VLC devices 22 and 24 preferably include variable cam phasing mechanisms to control phasing (i.e., relative timing) of opening and closing of the intake valve(s) 20 and the exhaust valve(s) 18, respectively. The phasing refers to shifting opening times of the intake and exhaust valve(s) 20 and 18 relative to positions of the crankshaft 12 and the piston 14 in the respective cylinder 15. The variable cam phasing systems of the VCP/VLC devices 22 and 24 preferably have a range of phasing authority of about 60°-90° of crank rotation, thus permitting the control module 5 to advance or retard opening and closing of one of intake and exhaust valve(s) 20 and 18 relative to position of the pistons 14 for each cylinder 15. The range of phasing authority is defined and limited by the VCP/VLC devices 22 and 24. The VCP/VLC devices 22 and 24 include camshaft position sensors (not shown) to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into the combustion chamber 16, in response to a control signal (INJ_PW) from the control module 5. As used herein, fueling refers to a mass fuel flow into one of the combustion chambers 16. The fuel injectors 28 are supplied pressurized fuel from a fuel distribution system (not shown).

The engine 10 includes a spark ignition system by which spark energy is provided to a spark plug 26 for igniting or assisting in igniting cylinder charges in each combustion chamber 16 in response to a control signal (IGN) from the control module 5. The spark plug 26 enhances control of combustion timing in each cylinder 15 of the engine 10 at certain conditions, e.g., during cold start and near a low load operation limit.

The engine 10 is equipped with various sensing devices for monitoring engine operation, including a crank sensor 42 operative to monitor crankshaft rotational position, i.e., crank angle and speed, a wide range air/fuel ratio sensor 40 adapted to monitor air/fuel ratio in the exhaust gas feedstream, and a combustion sensor 30 adapted to monitor in-cylinder combustion in real-time during ongoing operation of the engine 10. The combustion sensor 30 comprises a device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Alternatively, other sensing systems can be used to monitor real-time in-cylinder combustion parameters which can be translated into combustion phasing, e.g., ion-sense ignition systems and non-intrusive cylinder pressure monitoring systems.

Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present disclosure.

The control module 5 is preferably a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory and executed to provide the desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
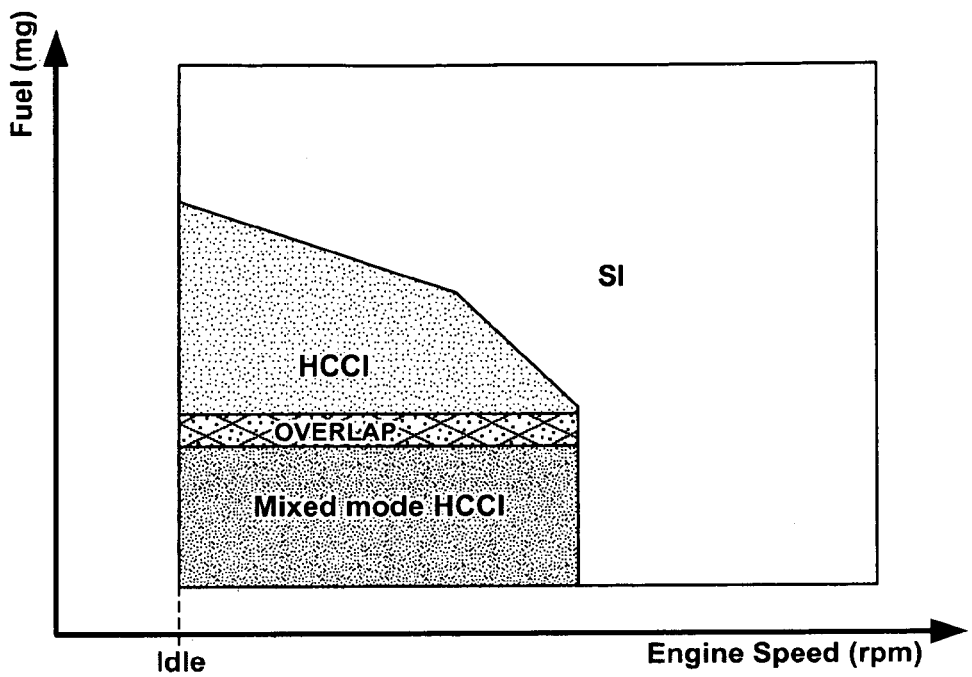
FIGS. 2 and 3 are control data graphs, in accordance with the present disclosure.

FIG. 2 graphically shows preferred combustion modes for operating the engine 10 based upon an engine operating point, depicted over a range of engine speeds (rpm) and loads represented in this embodiment by fuel (mg). The engine 10 can operate in a spark-ignition (SI) combustion mode, a controlled auto-ignition (HCCI) combustion mode, and a mixed (Mixed mode HCCI) combustion mode corresponding to an engine speed/load operating point. There can be overlap in operating ranges for the controlled auto-ignition (HCCI) combustion mode and the mixed (Mixed mode HCCI) combustion mode (OVERLAP). A preferred speed and load operating range for each of the combustion modes is determined based upon engine operating parameters, including combustion stability, fuel consumption, emissions, engine torque output, and others. Boundaries which define the preferred speed and load operating ranges to delineate operation in the aforementioned combustion modes are preferably precalibrated and stored in the control module 5.

The engine 10 is controlled to operate at a preferred air/fuel ratio for optimal performance, and the intake air flow is controlled to achieve the preferred air/fuel ratio. This includes estimating a cylinder air charge based upon engine operation in the selected combustion mode. The throttle valve 34 and VCP/VLC devices 22 and 24 are controlled to achieve an intake air flowrate based upon the estimated cylinder air charge, including during transitions between the combustion modes. Air flow is controlled by adjusting the throttle valve 34 and controlling VCP/VLC devices 22 and 24 to control the opening timing and profiles of the intake and exhaust valve(s) 20 and 18. Operation in each of the combustion modes can require different settings for the VCP/VLC devices 22 and 24 in terms of valve timing and profiles of the intake and exhaust valve(s) 20 and 18 and the throttle valve 34 for throttle position.

The controlled auto-ignition (HCCI) combustion mode includes operating the engine 10 with the throttle valve 34 wide-open with the fueling to the engine 10 controlled to achieve a lean air/fuel ratio and sufficient to meet an output torque request. The VCP/VLC devices 22 and 24 are preferably controlled at the low-lift valve open position and at a phasing that achieves a negative valve overlap period of a predetermined duration between closing of the exhaust valve(s) 18 and opening of the intake valve(s) 20 causing a recompression period. During the recompression period a high proportion of high temperature residual combustion products are retained from a previous combustion cycle and provide conditions for auto-ignition in a highly diluted mixture. Preferably there is a single fuel injection event, timed to occur during the intake stroke and early in the compression stroke.

The spark-ignition (SI) combustion mode includes operating the engine 10 with the throttle valve 34 controlled to regulate the intake air flow with the fueling to the engine 10 controlled to achieve a stoichiometric air/fuel ratio and sufficient to meet an output torque request. The VCP/VLC devices 22 and 24 are preferably controlled at the high-lift valve open position and at phasing that achieves a valve overlap between closing of the exhaust valve(s) 18 and opening of the intake valve(s) 20 to retain a small portion of residual combustion products from a previous combustion cycle in the spark-ignition (SI) combustion mode. The engine 10 operates in the spark-ignition (SI) combustion mode with a controlled throttle operation under conditions not conducive to the controlled auto-ignition (HCCI) combustion mode operation, and to achieve engine power to meet the output torque request.

The mixed (Mixed mode HCCI) combustion mode includes operating the engine 10 with the throttle valve 34 wide-open and with the fueling to the engine 10 controlled to achieve a lean air/fuel ratio. The VCP/VLC devices 22 and 24 are preferably controlled at the low-lift valve open position and at a phasing that achieves a negative valve overlap period of a predetermined duration between closing of the exhaust valve(s) 18 and opening of the intake valve(s) 20 causing a recompression period. During the recompression period a high proportion of the residual combustion products are retained from a previous combustion cycle and provide conditions for auto-ignition in a highly diluted mixture. Furthermore, there are multiple fuel injection events and associated spark events during each combustion cycle.

The mixed (Mixed mode HCCI) combustion mode preferably includes multiple fuel injection events per cylinder for each combustion cycle and multiple spark events during or immediately subsequent to one or two of the fuel injection events. This includes dividing the total required fuel mass per cycle into at least three fuel injection events. A first injection event occurs immediately prior to or during the recompression period, to effect fuel reforming. A second fuel injection event is introduced in one or more injection pulses preferably during the intake stroke, or alternatively early in the compression stroke. The second fuel injection event comprises the main fuel mass portion of the total required fuel mass per cycle to achieve a desired engine work output. The third injection event preferably occurs late in the compression stroke and comprises a flame propagation fuel injection event to achieve spray-guided combustion, i.e., to improve in-cylinder conditions for auto-ignition of the main fuel mass portion injected during the second fuel injection event. The mass of injected fuel during each of the first and third fuel injection events is a minimum fuel mass sufficient to achieve the purposes described herein. Spark discharges are initiated immediately following the first injection event and the third fuel injection event. Preferably there is no spark discharge associated with the second fuel injection event.

The multiple fuel injection events enable a split fuel injection strategy, wherein the first injection event causes a first portion of the total required fuel mass per cycle to be injected during the recompression period when the intake and exhaust valves 20 and 18 are both closed and gas temperatures and cylinder pressures are high. The injected fuel goes through partial oxidation, i.e., a reforming reaction, to produce extra heat for controlled auto-ignition (HCCI) that occurs in the power stroke. However, low engine load conditions lead to lower in-cylinder temperatures, and the fuel reforming during the recompression may not be enough to trigger auto-ignition. In this operating range, i.e., near idle operation, the third injection event causes a third portion of the total required fuel mass per cycle to be injected late in the compression stroke of the combustion cycle, referred to as a flame propagation fuel injection event. The flame propagation fuel injection event provides a stratified, spray-guided fueling in the cylinder that is ignited by spark ignition, propagating a combustion wave of ignited fuel that compresses the remaining fuel-air mixture in the combustion chamber to achieve auto-ignition. The fuel mass burned during reforming corresponds closely with combustion stability (COV of IMEP) and NOx emissions. It has been found that the NOx emissions are lower and combustion stability (COV of IMEP) increases with increased mass of reformed fuel during the recompression period. Furthermore, when more fuel is burned in the flame propagation fuel injection event due to spark ignition before auto-ignition there can be an increase in NOx emissions and a reduction in combustion stability.

Figure 3:
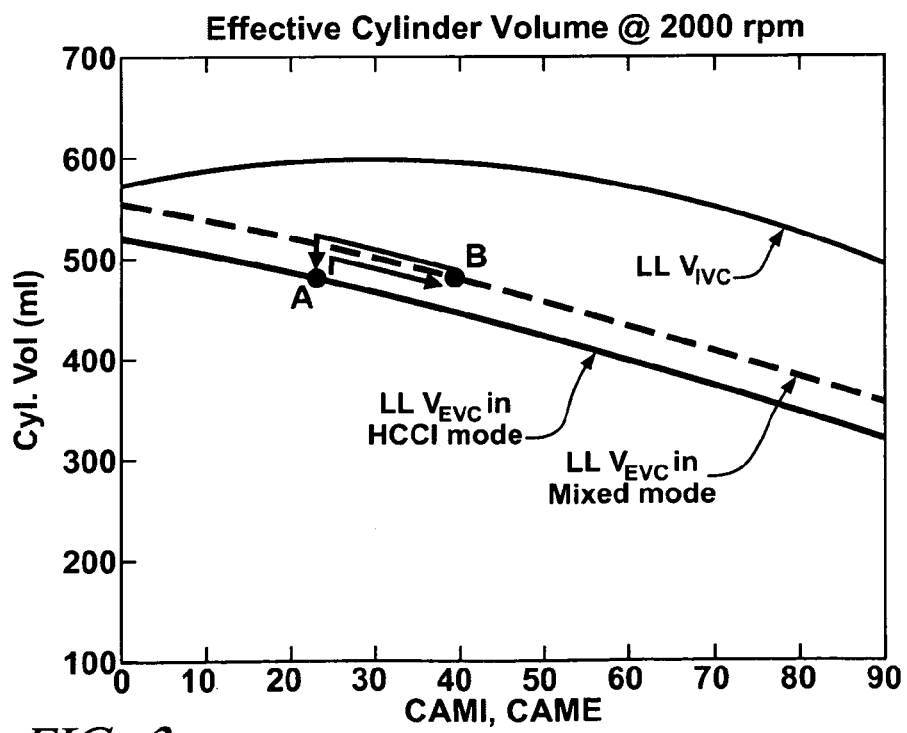

FIG. 3 shows effective cylinder volumes (Cyl. Vol) at intake valve closing and exhaust valve closing of an exemplary HCCI engine equipped with VCP/VLC devices 22 and 24 having 90° of cam phasing authority for both the intake and exhaust valves, with the variable lift devices operating at a low lift (LL) setting, with the engine 10 operating at a specific speed, which is 2000 rpm in this instance. A first line depicts effective cylinder volume at exhaust valve closing based upon the exhaust cam angle for a low lift lifter setting in the controlled auto-ignition (HCCI) combustion mode (LL $V_{EVC}$ in HCCI mode). A second line depicts effective cylinder volume at exhaust valve closing based upon the exhaust cam angle for a low lift lifter setting in the mixed (Mixed mode HCCI) combustion mode (LL $V_{EVC}$ in Mixed mode). A third line depicts effective cylinder volume at intake valve closing based upon the intake cam angle for a low lift lifter setting (LL $V_{IVC}$). The effective cylinder volume for fresh air charge $V_a$ is expressed as:

$$V_a = V_{IVC}(CAMI) - V_{EVC}(CAME) \qquad [1]$$

wherein $V_{IVC}$ and $V_{EVC}$ are the effective cylinder volumes at intake valve closing and exhaust valve closing, respectively, which are based upon the intake cam angle (CAMI) and the exhaust cam angle (CAME), respectively. As depicted, the zero degree intake and exhaust cam angles each indicate the crank angle between exhaust valve closing and intake valve opening is at a maximum value, i.e., a maximum negative valve overlap within the cam phasing authority. Exemplary cam angle set-points for the controlled auto-ignition (HCCI) combustion mode and the mixed (Mixed mode HCCI) combustion mode are shown as Points A and B. Points A and B depict operating points for the exemplary engine 10 at which the effective cylinder volumes are the same for the mixed (Mixed mode HCCI) combustion mode and the controlled auto-ignition (HCCI) combustion mode. The results indicate that the amounts of the fresh air charge for both the controlled auto-ignition (HCCI) combustion mode and the mixed (Mixed mode HCCI) combustion mode are similar for Points A and B, with the mixed (Mixed mode HCCI) combustion mode requiring a smaller recompression period and less negative valve overlap. Thus the fuel injection events and the spark ignition timings are preferably coordinated with cam angles such that combustion stability is maintained during any transition between the controlled auto-ignition (HCCI) combustion mode and the mixed (Mixed mode HCCI) combustion mode.

When the engine 10 operates in the mixed (Mixed mode HCCI) combustion mode at low-load, the in-cylinder reforming during the recompression period reduces intake airflow. Thus the recompression period and the negative valve overlap of the mixed (Mixed mode HCCI) combustion mode are less than that of the controlled auto-ignition (HCCI) combustion mode. Thus, when the combustion mode transitions from the mixed (Mixed mode HCCI) combustion mode to the controlled auto-ignition (HCCI) combustion mode, more air is immediately inducted since reforming is off and negative valve overlap is smaller due to relatively slow response time dynamics of the VCP/VLC devices 22 and 24 as compared to the spark ignition system and the fuel injection system. Furthermore, the cylinder volume includes a significant amount of hot residual gas during operation in the controlled auto-ignition (HCCI) and mixed (Mixed mode HCCI) combustion modes, which can substantially affect the fresh air charge. The fuel injected during the recompression period due to the first injection event is either reformed or burned by spark, causing the in-cylinder pressure of the residual gas to increase, resulting in less available volume for a fresh air charge when the intake valve subsequently opens. The fresh air charge to the engine reduces.

The control module 5 executes algorithmic code to control operation of the engine 10. Operating the exemplary engine 10 described herein includes monitoring an engine operating point, preferably related to an operator torque request for output power and a system request for output power, e.g., for auxiliary loads. When there is a change in the engine operating point indicating that the preferred combustion mode for operating the engine 10 has changed, the control module can command a transition from the present combustion mode to a second combustion mode comprising the preferred combustion mode for the engine operating point. This can include commanding a transition from the mixed (Mixed mode HCCI) combustion mode to the controlled auto-ignition (HCCI) combustion mode when the engine operating point increases to greater than a predetermined threshold. This can also include commanding a transition from the controlled auto-ignition (HCCI) combustion mode to the mixed (Mixed mode HCCI) combustion mode when the engine operating point decreases to less than a predetermined threshold.

The command to transition from the present combustion mode to the second, preferred combustion mode includes commanding a change in openings and closings of the intake and exhaust valves 20 and 18 to a preferred duration of a negative valve overlap period corresponding to operating in the second combustion mode. In one embodiment, this comprises controlling the VCP/VLC devices 22 and 24 to achieve desired positions. The control module 5 adjusts the fuel injection parameters and the spark ignition events to effect operation in the second combustion mode only when a realized duration of the negative valve overlap period exceeds a predetermined threshold, i.e., the VCP/VLC devices 22 and 24 have achieved their desired positions. By controlling operation of the engine 10 in this manner, the single-injection controlled auto-ignition (HCCI) combustion mode is not enabled while the negative valve overlap period is too small, preventing cylinder misfires or partial burns. For example, if a transition from the mixed (Mixed mode HCCI) combustion mode to the single-injection controlled auto-ignition (HCCI) combustion mode were commanded followed by an immediate change in the injection parameters and spark ignition timings corresponding to the single-injection controlled auto-ignition (HCCI) combustion mode, the sudden increment in air charge can result in too lean air/fuel ratio for the single-injection controlled auto-ignition (HCCI) combustion mode, causing misfires or partial burns. As described herein, during a commanded transition between the controlled auto-ignition (HCCI) combustion mode and the mixed (Mixed mode HCCI) combustion mode, the control module 5 executes code to coordinate fuel injection timing and spark timing with transitions in the openings and closings of the intake and exhaust valves 20 and 18 such that combustion is robustly maintained. Command rules for engine operation are applied during mode transitions to avoid misfires or partial burns.

A transition from the controlled auto-ignition (HCCI) combustion mode to the mixed (Mixed mode HCCI) combustion mode is commanded when the engine operating point decreases to less than a predetermined threshold that indicates preferred operation in the mixed (Mixed mode HCCI) combustion mode, an example of which is shown in FIG. 2. This includes commanding change(s) in openings and closings of the intake and exhaust valves 20 and 18 to a preferred duration of a negative valve overlap period corresponding to operating in the mixed (Mixed mode HCCI) combustion mode, e.g., by controlling one or both of the VCP/VLC devices 22 and 24. Coincidentally, i.e., at the same time, the fuel injection parameters and the spark ignition events are adjusted to effect operation in the mixed (Mixed mode HCCI) combustion mode, as described herein. When the transition is commanded from the controlled auto-ignition (HCCI) combustion mode to the mixed (Mixed mode HCCI) combustion mode, the control module 5 determines timings for fuel injection and spark ignition for operating in the mixed (Mixed mode HCCI) combustion mode, and immediately applies them. Thus the engine 10 is operated with three or more fuel injection events per cylinder event or combustion cycle, with corresponding spark ignition for the fuel injection event during the recompression period and for the flame propagation fuel injection event. The VCP/VLC devices 22 and 24 are commanded to preferred positions for operating in the mixed (Mixed mode HCCI) combustion mode, preferably comprising a negative valve overlap of a predetermined duration that is less than the duration occurring in the controlled auto-ignition (HCCI) combustion mode, leading to a reduced recompression period A transition from the mixed (Mixed mode HCCI) combustion mode to the controlled auto-ignition (HCCI) combustion mode is commanded when the engine operating point increases to greater than a predetermined threshold that indicates preferred operation in the controlled auto-ignition (HCCI) combustion mode, an example of which is shown in FIG. 2. This includes commanding change(s) in openings and closings of the intake and exhaust valves 20 and 18 to a preferred duration of a negative valve overlap period corresponding to operating in the controlled auto-ignition (HCCI) combustion mode. In this transition, the control module 5 determines a total engine fuel mass per cylinder event for operating in the controlled auto-ignition (HCCI) combustion mode. A small portion of the determined total cycle's fuel mass is injected and spark is ignited during the recompression period with pre-determined timings to facilitate operation in the controlled auto-ignition (HCCI) combustion mode until the realized duration of the negative valve overlap exceeds the preferred duration of the negative valve overlap period corresponding to operating the engine 10 in the controlled auto-ignition (HCCI) combustion mode. The timings for injection of the rest of fuel and spark ignition are also determined for operating in the controlled auto ignition combustion mode and immediately applied. The VCP/VLC devices 22 and 24 are commanded to preferred positions for operating in the controlled auto-ignition (HCCI) combustion mode. When the VCP/VLC devices 22 and 24 achieve the commanded preferred positions for operating in the controlled auto-ignition (HCCI) combustion mode, injection timing and fuel mass is injected in accordance with operating in the controlled auto-ignition (HCCI) combustion mode.

Figure 4:
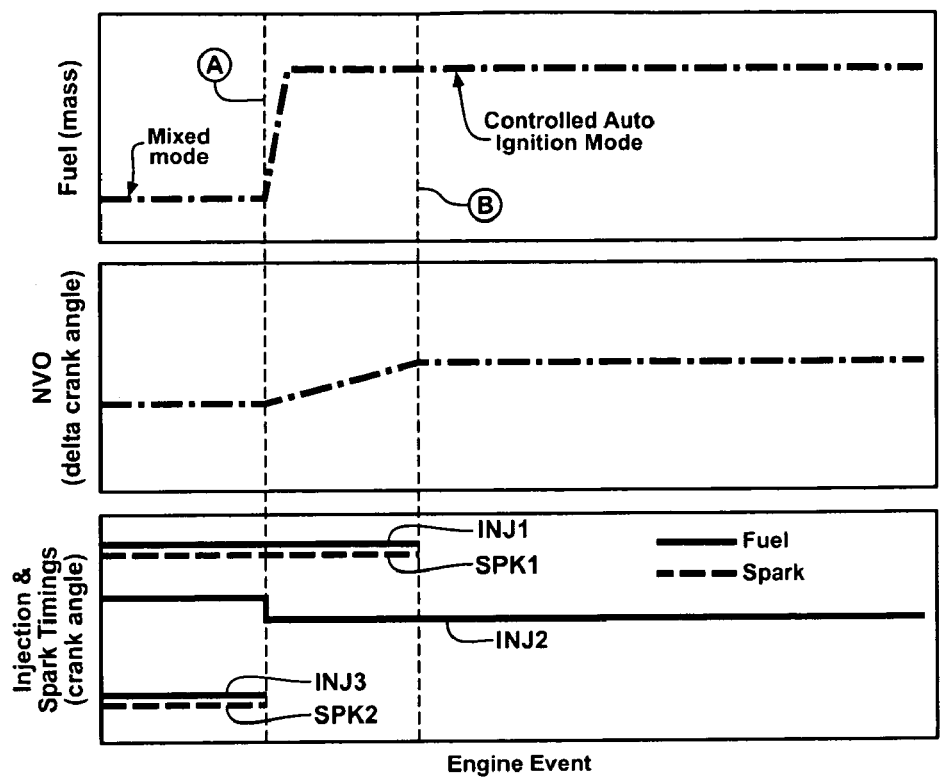
FIGS. 4 and 5 are timing data graphs, in accordance with the present disclosure.

FIG. 4 graphically shows a timing graph depicting operating parameters during a transition from the mixed (Mixed mode HCCI) combustion mode to the controlled auto-ignition (HCCI) combustion mode for an exemplary engine operating as described herein. The operating parameters include fuel (Fuel), valve overlap (NVO) and timing of fuel injection and spark ignition (Injection & Spark Timings). The engine is initially operating in the mixed (Mixed mode HCCI) combustion mode with three fuel injection events (INJ1, INJ2, INJ3) and two spark ignition events (SPK1, SPK2) corresponding in time immediately after two of the fuel injection events. At a first point (A) there is a command to transition to the controlled auto-ignition (HCCI) combustion mode. Immediately thereafter the fuel mass transitions to a fuel mass for operating in the controlled auto-ignition (HCCI) combustion mode. The VCP/VLC devices 22 and 24 are commanded to transition to the valve overlap associated with operation in the controlled auto-ignition (HCCI) combustion mode. Immediately thereafter, the third fuel injection event and the second spark ignition event are discontinued, and the timing of the second fuel injection event transitions to a fuel injection timing associated with operation in the controlled auto-ignition (HCCI) combustion mode. At a subsequent point (B) the VCP/VLC devices 22 and 24 achieve the preferred valve overlap associated with operation in the controlled auto-ignition (HCCI) combustion mode, and the first fuel injection event and the first spark ignition event are discontinued. The engine continues operation in the controlled auto-ignition (HCCI) combustion mode using the single fuel injection event comprising the second fuel injection event (INJ2) to deliver the entire fuel mass.

Figure 5:
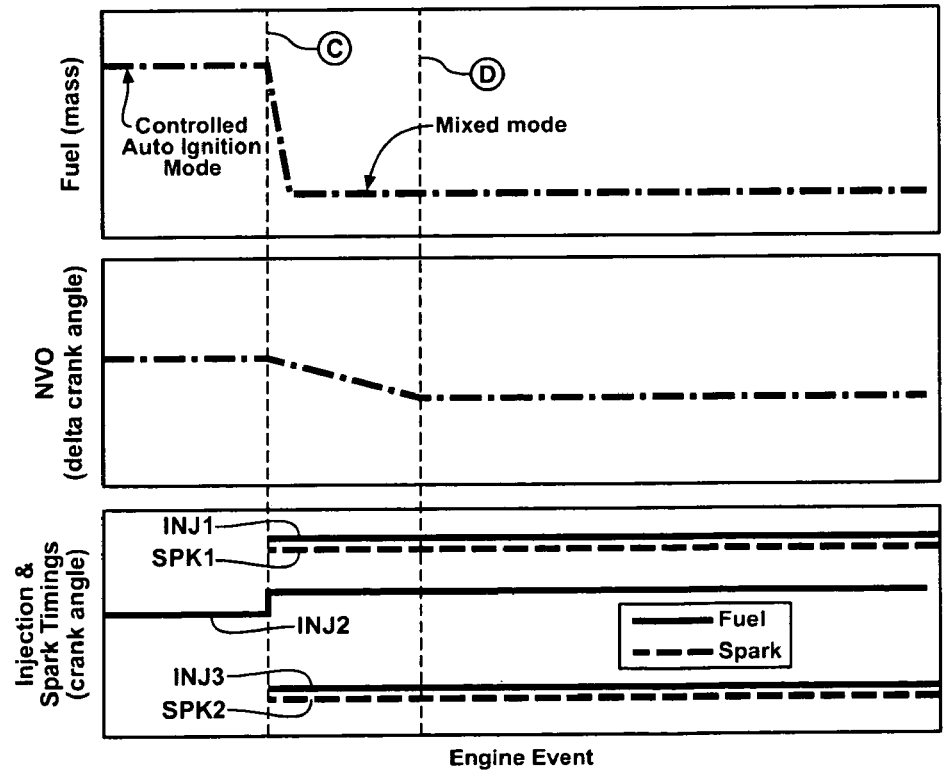

FIG. 5 graphically shows a timing graph depicting operating parameters during a transition from the controlled auto-ignition (HCCI) combustion mode to the mixed (Mixed mode HCCI) combustion mode for an exemplary engine operating as described herein. The operating parameters include fuel (Fuel), valve overlap (NVO) and timing of fuel injection and spark ignition (Injection & Spark Timings). The engine is initially operating in the controlled auto-ignition (HCCI) combustion mode with a single fuel injection event (INJ2) to deliver the entire fuel mass. At a first point (C) there is a command to transition to the mixed (Mixed mode HCCI) combustion mode. Immediately thereafter the fuel mass transitions to a fuel mass for operating in the mixed (Mixed mode HCCI) combustion mode. The VCP/VLC devices 22 and 24 are commanded to transition to the valve overlap associated with operation in the mixed (Mixed mode HCCI) combustion mode. Immediately thereafter, the first and third fuel injection events (INJ1, INJ2, INJ3) and the first and second spark ignition events (SPK1, SPK2) are initiated, and the timing of the second fuel injection event transitions to a fuel injection timing associated with operation in the mixed (Mixed mode HCCI) combustion mode. At a subsequent point (D), the VCP/VLC devices 22 and 24 achieve the preferred valve overlap associated with operation in the mixed (Mixed mode HCCI) combustion mode. The commands related to the transition are completed at the first point (C) with the VCP/VLC devices 22 and 24 taking additional time to adjust.

Figure 6:
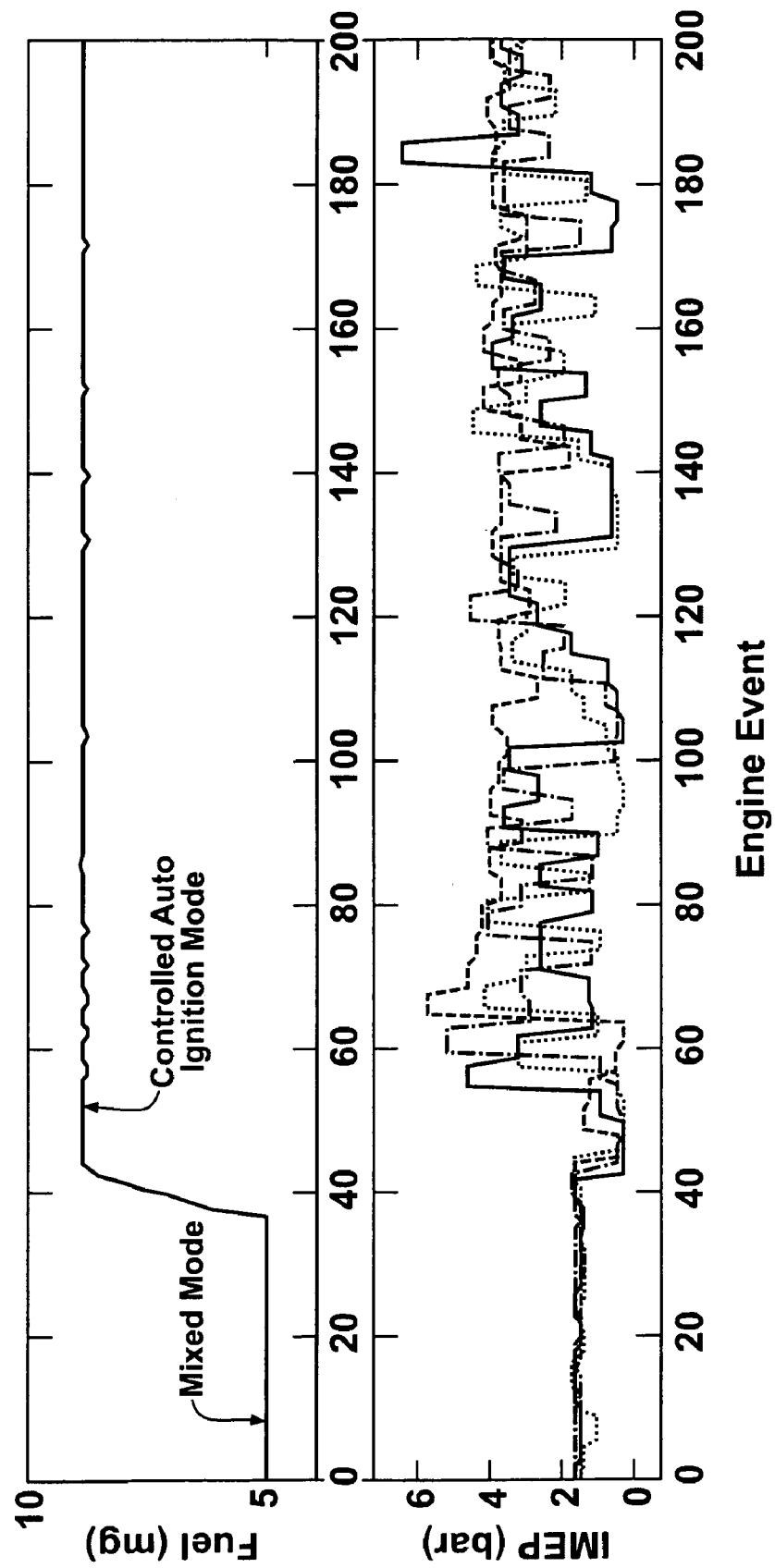
FIGS. 6 and 7 are results data graphs, in accordance with the present disclosure.

FIG. 6 graphically shows operating results during a transition from the mixed (Mixed mode HCCI) combustion mode to the controlled auto-ignition (HCCI) combustion mode for an exemplary four cylinder engine operating when injection and spark timings of corresponding combustion mode are immediately applied after combustion mode transition is commanded when the engine is operating at about 2000 rpm. Data includes engine fueling (Fuel (mg)) and mean-effective pressure (IMEP (bar)) for each of the cylinders. The operating results indicate substantial variations in IMEP are indicative of incomplete combustion and misfire events that can occur absent use of the transition scheme described herein.

Figure 7:
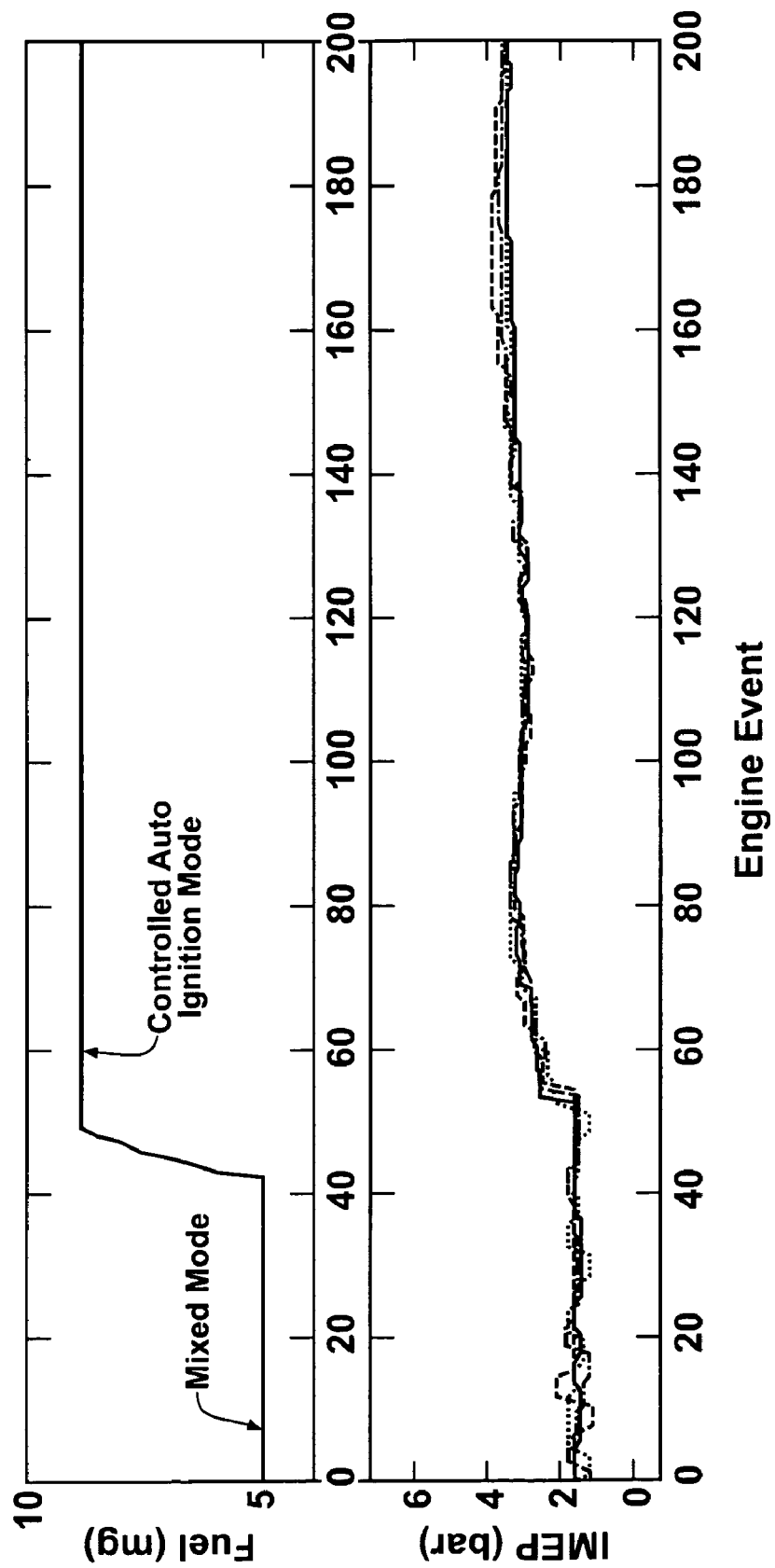

FIG. 7 graphically shows operating results during a transition from the mixed (Mixed mode HCCI) combustion mode to the controlled auto-ignition (HCCI) combustion mode for an exemplary four cylinder engine operating as described herein, at about 2000 rpm. Data includes engine fueling (Fuel (mg)) and mean-effective pressure (IMEP (bar)). The operating results indicate substantial reduction in variations in IMEP using the transition scheme described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a spark-ignition, direct fuel injection internal combustion engine including a system operative to vary openings and closings of intake and exhaust valves, comprising:
   monitoring an engine operating point;
   commanding a transition from a first combustion mode to a second combustion mode in response to a change in the engine operating point;
   commanding changes in openings and closings of the intake and exhaust valves to effect a preferred duration of a negative valve overlap period corresponding to operating in the second combustion mode; and
   adjusting fuel injection parameters and adjusting spark ignition events to effect operation in the second combustion mode only when a realized duration of the negative valve overlap period exceeds a predetermined overlap period threshold.

2. The method of claim 1, wherein
the first combustion mode comprises a controlled auto-ignition combustion mode and the second combustion mode comprises a mixed combustion mode,
the change in the engine operating point comprises a decreases to less than a predetermined operating point threshold, and
adjusting the fuel injection parameters and adjusting the spark ignition events comprises coincidentally adjusting the fuel injection parameters and the spark ignition events.

3. The method of claim 2, wherein adjusting the fuel injection parameters comprises executing three fuel injection events during each cylinder event to effect operation in the mixed combustion mode.

4. The method of claim 3, further comprising executing one of the fuel injection events during the negative valve overlap period.

5. The method of claim 4, comprising executing a spark ignition event subsequent to the fuel injection event during the negative valve overlap period.

6. The method of claim 3, further comprising executing one of the fuel injection events late in a subsequent compression stroke.

7. The method of claim 6, comprising executing a spark ignition event subsequent to the fuel injection event late in the subsequent compression stroke.

8. The method of claim 1, wherein
the first combustion mode comprises a mixed combustion mode and the second combustion mode comprises a controlled auto-ignition combustion mode,
the change in the engine operating point comprises an increase to greater than a predetermined operating point threshold, and
the predetermined overlap period threshold comprises the preferred duration of the negative valve overlap period corresponding to operating the engine in the controlled auto-ignition combustion mode.

9. The method of claim 8, further comprising executing a single fuel injection event to effect operation in the controlled auto-ignition mode.

10. The method of claim 8, further comprising discontinuing the spark ignition events to effect operation in the controlled auto-ignition mode.

11. Method for operating a spark-ignition, direct fuel injection internal combustion engine including a system operative to vary openings and closings of intake and exhaust valves, comprising:
commanding a transition from a first combustion mode to a second combustion mode;
commanding changes in openings and closings of the intake and exhaust valves to effect a preferred duration of a negative valve overlap period corresponding to operating in the second combustion mode; and
during a recompression period, injecting a portion of a total required fuel mass and igniting the spark to facilitate operation in the second combustion mode until a realized duration of the negative valve overlap period exceeds a predetermined threshold.

12. The method of claim 11, further comprising
commanding a transition from a controlled auto-ignition combustion mode to a mixed combustion mode when the engine operating point decreases to less than a predetermined threshold;
commanding changes in the openings and closings of the intake and exhaust valves to effect a preferred duration of a negative valve overlap period corresponding to operating in the mixed combustion mode and coincidentally adjusting the fuel injection parameters and adjusting the spark ignition events to effect operation in the mixed combustion mode.

13. The method of claim 12, wherein adjusting the fuel injection parameters comprises executing three fuel injection events during each cylinder event to effect operation in the mixed combustion mode.

14. The method of claim 13, further comprising executing one of the fuel injection events during the negative valve overlap period.

15. The method of claim 14, comprising executing a spark ignition event subsequent to the fuel injection event during the negative valve overlap period.

16. The method of claim 13, further comprising executing one of the fuel injection events late in a subsequent compression stroke.

17. The method of claim 16, comprising executing a spark ignition event subsequent to the fuel injection event late in the subsequent compression stroke.

18. The method of claim 11, further comprising:
commanding a transition from a mixed combustion mode to a controlled auto-ignition combustion mode when the engine operating point increases to greater than a predetermined threshold;
commanding changes in openings and closings of the intake and exhaust valves to effect a preferred duration of a negative valve overlap period corresponding to operating in the controlled auto-ignition combustion mode; and
during a recompression period, injecting a portion of a total required fuel mass and igniting the spark to facilitate operation in the second combustion mode until a realized duration of the negative valve overlap period exceeds the preferred duration of the negative valve overlap period corresponding to operating the engine in the controlled auto-ignition combustion mode.

19. The method of claim 18, further comprising executing a single fuel injection event to effect operation in the controlled auto-ignition mode.

20. The method of claim 19, further comprising discontinuing spark ignition events to effect operation in the controlled auto-ignition mode.

* * * * *